Nov. 15, 1960        R. LOPEZ        2,959,886
READING BOARD FOR HOLDING BOOKS AND NEWSPAPERS
Filed Sept. 4, 1959        2 Sheets-Sheet 1
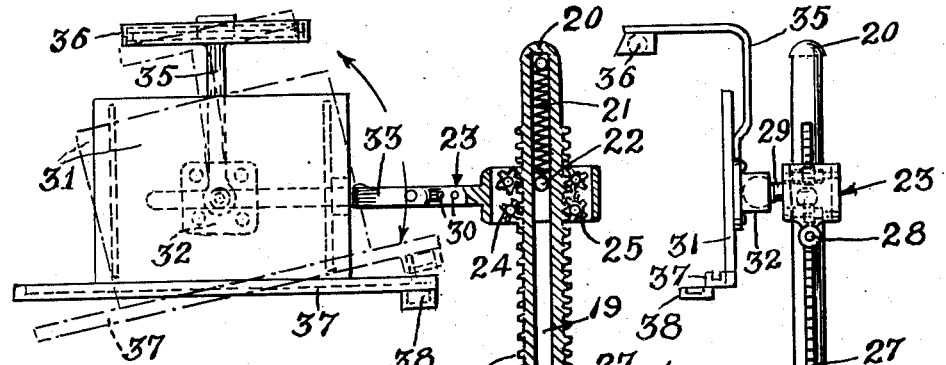
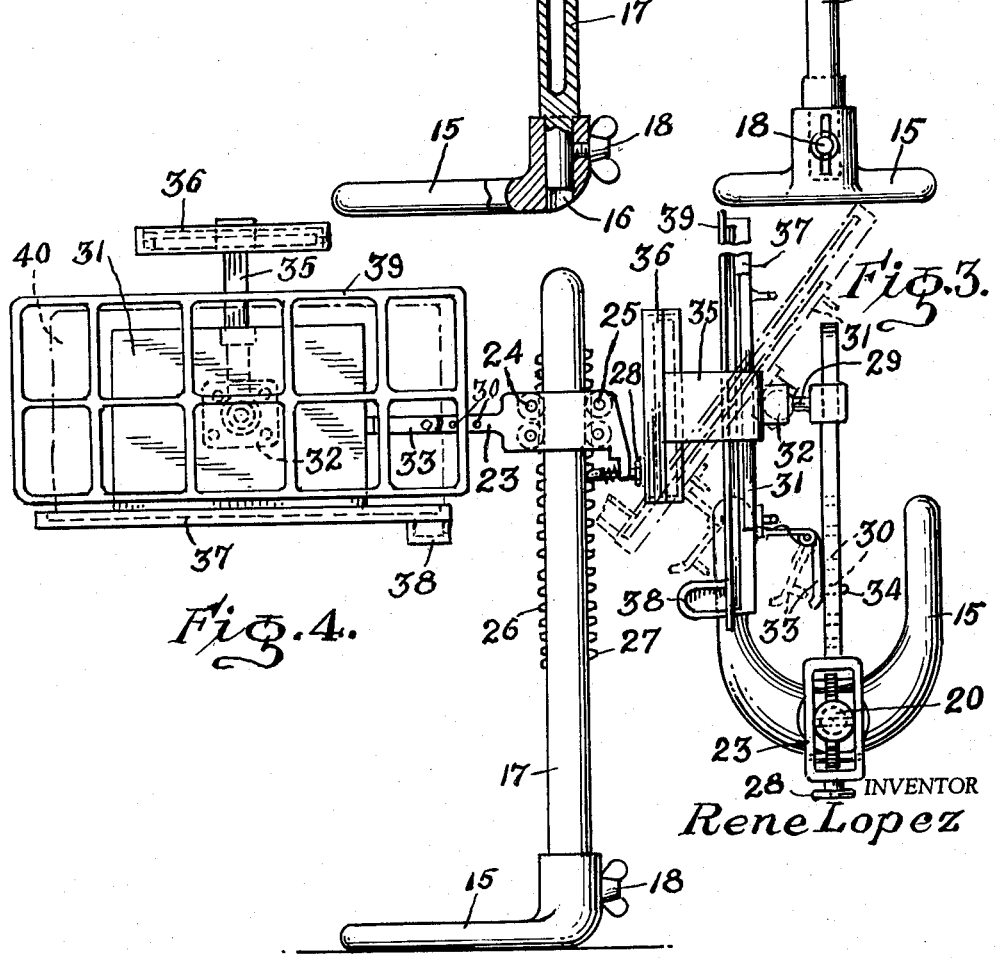
INVENTOR
*Rene Lopez*

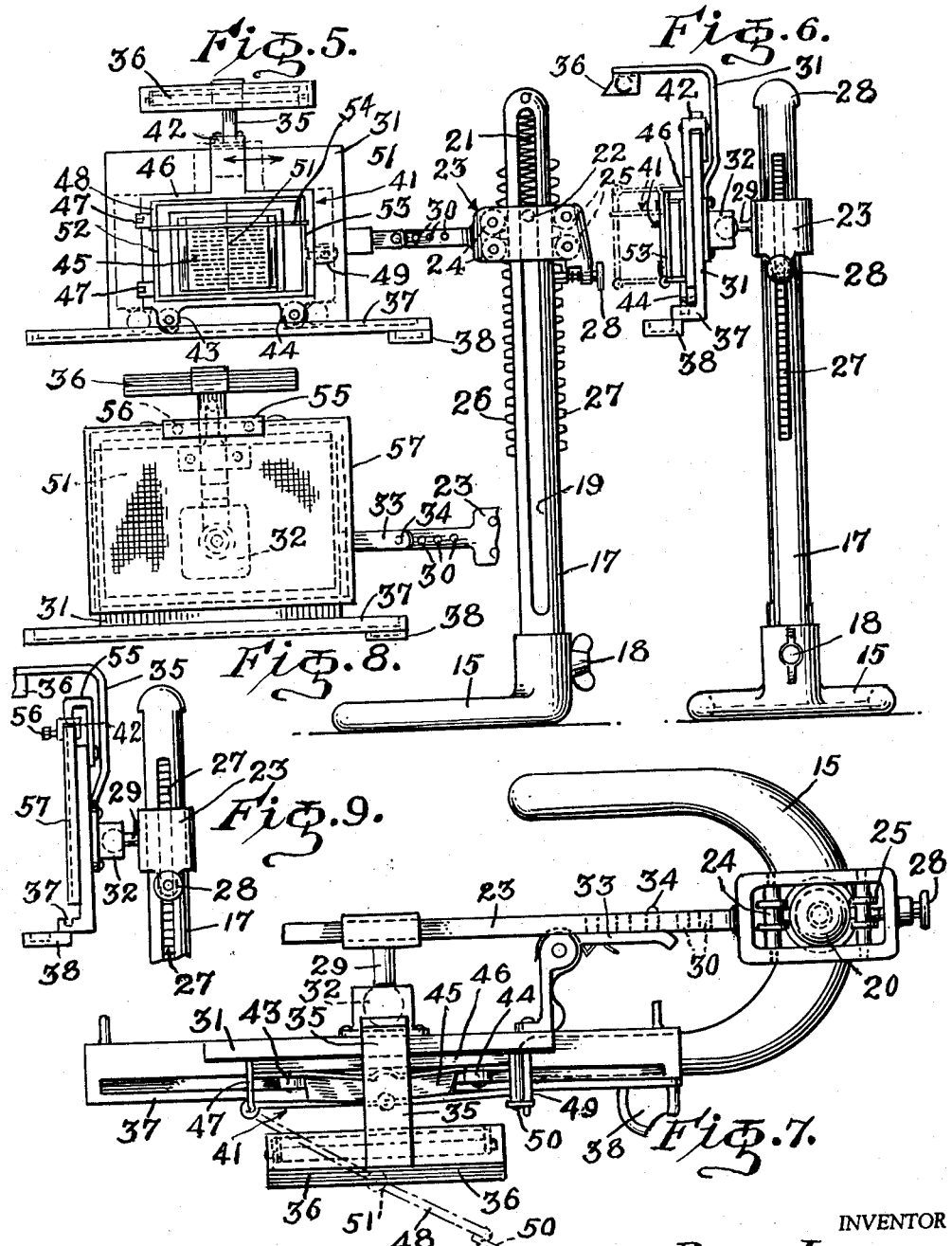

United States Patent Office 2,959,886
Patented Nov. 15, 1960

2,959,886

READING BOARD FOR HOLDING BOOKS AND NEWSPAPERS

Rene Lopez, 415 W. 57th St., New York, N.Y.

Filed Sept. 4, 1959, Ser. No. 838,232

3 Claims. (Cl. 45—80)

This invention relates to a reading board for holding books and newspapers.

It is the principal object of the present invention to provide a reading board and support which not only can support a book for reading but which is adapted to hold a frame for a newspaper or an easel board or canvas screen.

It is another object of the invention to provide a reading board that has a simple means for connecting a book thereto.

It is still another object of the invention to provide a book support in which the arm and book rest is spring supported on the vertically-extending support and interlocked therewith by gears on the opposite sides of the support and can be retained in its lowered position against the action of the spring by a lock screw.

It is a further object of the invention to provide a board stand in which the reading board has a swivel connection with the laterally-extending supporting arm.

It is a still further object of the invention to provide a reading board having a book support for clamping and retaining the book in which the same can be adjusted laterally upon wheels in a bottom trough and over the surface of the reading board.

Other objects of the invention are to provide a reading board and support therefor, having the above objects in mind, which is of simple construction, inexpensive to manufacture, has a minimum number of parts, light in weight, easily adapted and adjusted for proper viewing by the reader, compact, durable, efficient and effective in use.

For a better understanding of the invention, reference may be had to the following detailed description taken in connection with the accompanying drawing, in which—

Figure 1 is a front elevational view of the reading board with portions of its stand or support broken away to show the interior construction thereof, Fig. 2 is a side elevational view of the reading board and its support, Fig. 3 is a top plan view with illustration made as to the manner in which the reading board can be swiveled upon the support arm, Fig. 4 is a front elevational view of the reading board and its support with the newspaper carrier resting thereon, the book holder having been removed, Fig. 15 is a front elevational view of the reading board with the wheeled holder for the book lying over the supporting board, Fig. 6 is a side elevational view of the reading board and its support with the book holder in place, Fig. 7 is an enlarged top plan view of the reading board with the book holder thereon, Fig. 8 is a fragmentary front plan view of the reading board adapted for use as an easel, and Fig. 9 is a fragmentary side elevational view of the reading board adapted for use as an easel and with the easel attached thereto.

Referring now to the figures, 15 represents a base member of U-shaped and adapted to rest upon its side. This base has a vertically-extending hole 16 to receive a vertical rod support 17 that is made secured in the hole 16 of the base by a thumb screw 18. This rod has an elongated slot 19 therein and suspended from a top 20 in the slot 19 is a tension spring 21 that is connected by a pin 22 with an arm assembly 23. This arm assembly has vertically-spaced pairs of gears 24 and 25 on the opposite sides of the rods 17 that mesh respectively with gear racks 26 and 27. The spring 21 normally supports and holds the arm assembly 23 in an elevated position. The arm assembly 23 can be held in a lowered position against the action of the spring 21 by pulling the same down and resetting detent 28 that engages rack teeth 27. The arm assembly extends laterally and has a bar swivel 29 that is adjustable thereon. A series of adjusting holes 30 are provided on the arm assembly. A reading board 31 has a socket 32 on its rear face that engages with the bar member 29 so that the reading board 31 can be hinged universally upon the bar member 29. This board 31 has a latch 33 with a pin 34 for engaging any one of the holes 30 to hold the reading board 31 in its laterally-adjusted position on the arm assembly 23 and against pivoting on the bar member 29. Extending upwardly from the rear of the reading board 31 is a lamp bracket 35 having a laterally-extending lamp 36. On the lower end of the reading board 31 is a wheeled trough 37 with an extension 38 thereon for supporting a glass tumbler. A newspaper frame 39 to which a newspaper 40 has been slid can be rested upon the trough 37 in the manner shown in Figs. 3 and 4.

In Figs. 5, 6, and 7, there is shown a laterally adjustable book holder 41 which may be supported upon the reading board 31. This book holder has wheels 42 that are adjustable along the upper edge of the board 31 and bottom wheels 43 and 44 that are adjustable in the trough 37. Accordingly the book holder with a book 45 can be adjusted to the left or right as desired. This book holder has a back plate 46 with outwardly extending hinge members 47 to which a retaining frame 48 is hingedly connected. The book 45 is spread open and the frame 48 is hinged over the same and is locked to a latch plate 49 at the opposite side of the book holder by its latch plate 50. This book retaining frame has a centrally-vertically extending bar 51 that engages with the center of the book and the pages can be turned through the frame 48 as desired. The hinge members 47 and the latch plate 49 preferably have adjusting holes to which the retaining frame 48 is connected and adjusted according to the thickness of the book. The newspaper frame 39 can be locked on the bookholder 41 by the hinge members 47 and latch plate 49. On this same frame 48 are vertical sides 52 and 53 which has extending between them a vertically adjustable bar 54 that can be drawn vertically over the pages of the book and serves to hold the pages open as well as to provide a line guide, Fig. 5.

As shown in Figs. 8 and 9, there is provided an outwardly extending clamp bracket 55 having clamp screws 56 adapted to retain a painting canvas frame 57 in place over the reading board 31 with its lower edge elevated from the trough so that the trough can be used for retaining brushes and the extension 38 for a tumbler of water.

While various changes may be made in the detailed construction, it shall be understood that such changes shall be within the spirit and scope of the present invention as defined by the appended claims.

What is claimed is:

1. A reading board for holding books, newspapers, and the like, comprising, a base, a hollow vertical rod extending upwardly from the base, gear racks disposed along opposite sides of said rod, a slot formed diametrically through said rod, a tension spring received within the hollow rod and secured at one end to the top thereof, a pin extending through said slot and engaged by the other end of said spring, an arm assembly having one end slidably received over said rod and extending normally thereto, said end having an opening mounting pairs of gears adapted to engage with said gear racks, said pin being anchored within said opening intermediate said gears, a releasable detent secured to said end and adapted to selectively lock with one of said gear racks, a bar member mounted for lateral adjustment over the other end of said arm assembly, a reading board having a socket mounted centrally thereof for universal securement to said bar member, and a trough disposed along the lower edge of the reading board.

2. A reading board according to claim 1 wherein said lateral adjustment of said bar member is locked by a latch having a pin selectively engaging in one of a series of spaced apart holes disposed along said arm assembly and wherein the latch is screwed at one end to the reading board.

3. A reading board according to claim 1 wherein said trough is engaged by wheels rotatably supported and laterally spaced beneath the lower edge of a book holder.

References Cited in the file of this patent

UNITED STATES PATENTS

| | | |
|---|---|---|
| 278,116 | Fisher | May 22, 1883 |
| 368,388 | Drake | Aug. 16, 1887 |
| 1,653,657 | Pretsch | Dec. 27, 1927 |
| 1,928,327 | Butler | Sept. 26, 1933 |
| 1,976,034 | Poetsch | Oct. 9, 1934 |
| 2,683,067 | Hartman | July 6, 1954 |